Figure 1:
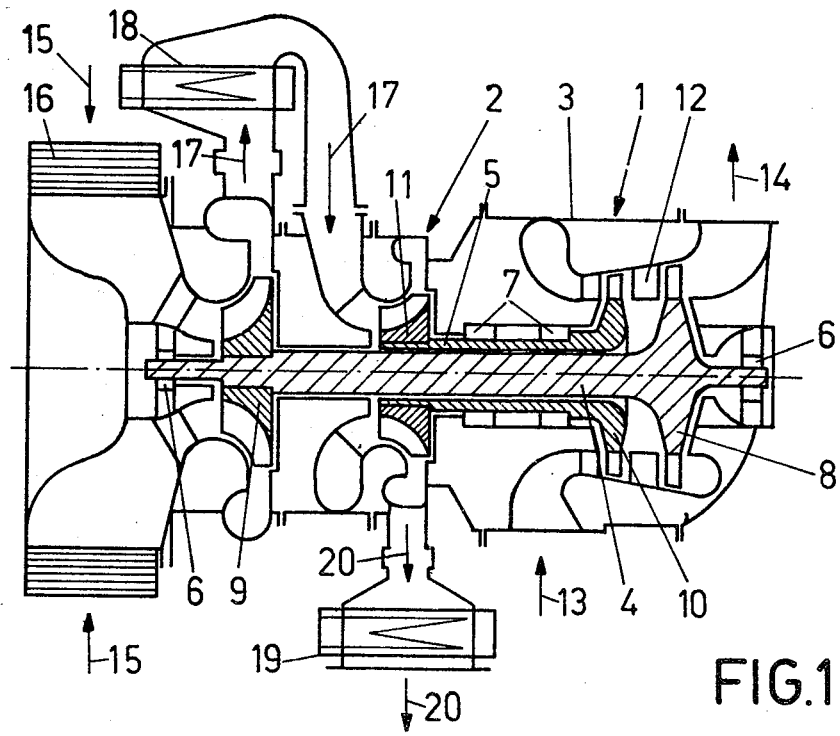

United States Patent [19]

Curiel et al.

[11] 4,155,684
[45] May 22, 1979

[54] TWO-STAGE EXHAUST-GAS TURBOCHARGER

[75] Inventors: Georges Curiel, Wettingen; Ulrich Linsi, Zurich, both of Switzerland

[73] Assignee: BBC Brown Boveri & Company Limited, Baden, Switzerland

[21] Appl. No.: 868,743

[22] Filed: Jan. 12, 1978

Related U.S. Application Data

[63] Continuation of Ser. No. 718,526, Aug. 30, 1976, abandoned.

[30] Foreign Application Priority Data

Oct. 17, 1975 [CH] Switzerland ............... 13489/75

[51] Int. Cl.² ............................................. F04B 17/00
[52] U.S. Cl. ......................................... 417/409; 415/69;
415/199.2; 417/243; 417/244; 417/247;
417/360
[58] Field of Search ............... 417/243, 244, 246, 247,
417/360, 405–409; 415/68, 69, 199.2; 60/39.16 R

[56] References Cited

U.S. PATENT DOCUMENTS

| 2,645,412 | 7/1953 | Sens .................................... 417/247 |
| 2,689,681 | 9/1954 | Sabatiuk ............................... 415/69 |
| 2,839,005 | 6/1958 | Means .................................. 417/407 |
| 3,524,318 | 8/1970 | Bauger et al. ........................ 415/68 |
| 3,526,092 | 9/1970 | Steel .................................... 417/407 |
| 3,971,208 | 7/1976 | Schwent .......................... 60/39.16 R |

FOREIGN PATENT DOCUMENTS

| 559068 | 6/1958 | Canada ................................ 417/247 |
| 1126739 | 11/1956 | France ................................ 417/406 |
| 1199567 | 12/1959 | France ................................ 417/247 |
| 697285 | 9/1953 | United Kingdom ................ 417/247 |

Primary Examiner—C. J. Husar
Attorney, Agent, or Firm—Burns, Doane, Swecker & Mathis

[57] ABSTRACT

An exhaust-gas turbocharger includes a low pressure stage having a compressor wheel and a turbine wheel mounted on one shaft and a high pressure stage having a compressor wheel and a turbine wheel mounted on another shaft. The two shafts are arranged coaxially one within the other, and the compressor and turbine units of either stage can be located on the inner or outer shaft.

14 Claims, 6 Drawing Figures

TWO-STAGE EXHAUST-GAS TURBOCHARGER

This is a continuation, of Application Serial No. 718,526, filed on Aug. 30, 1976, and now abandoned.

The present invention concerns an improved construction for a two-stage exhaust-gas turbocharger, with two coaxial shafts, one inside the other, contained in a housing, LP and HP stages each having a bladed turbine wheel and a bladed compressor wheel, and each shaft carrying one turbine wheel and one compressor wheel.

The abbreviations LP and HP denote low pressure and high pressure, respectively.

It is known that supercharging an internal combustion engine, the output of which is to be raised above that attainable with a single-stage turbocharger can be achieved with a two-stage turbocharger having an LP stage comprising an LP turbine and an LP compressor, and an HP stage comprising an HP turbine and an HP compressor. Various turbochargers of this kind have already been made.

In a design which is of advantage from the standpoint of saving space, published in the journal "Hansa" No. 20/74, two coaxial shafts, one inside the other, in a common housing are used. In this instance the LP compressor wheel and the HP turbine wheel are located on the inner shaft, and the HP compressor wheel and the LP turbine wheel on the outer shaft. This pairing of the HP turbine with the LP compressor and the LP turbine with the HP compressor has disadvantages, however, as an unfavourable distribution of the volumes conveyed per shaft can result, and this can give rise to a very unfavourable combination with regard to efficiency, strength, and vibrations. Thus it can happen that, on the one hand, a very narrow HP compressor wheel or an LP turbine with very long blades has to be used, or on the other hand, a very broad HP compressor wheel or a HP turbine with very short blades.

The object of the present invention is to avoid these disadvantages and to create a two-stage turbocharger of the general kind mentioned initially with which a more favourable distribution of the volumes conveyed and hence a more favourable pairing in terms of the aspects stated above is achieved.

This objective is achieved in that the wheels of the turbocharger mounted on one shaft belong to the same stage.

In the present invention, rational distribution of the volumes to be conveyed—a favourable feature as regards strength, vibrations, and efficiency of the turbocharger—is combined in a simple manner with a construction of two coaxial shafts, one inside the other, which is of benefit as regards saving space. Furthermore, there is the possibility of implementing the basic configuration in various alternative forms, depending on the particular requirements arising in practice.

For example, the shaft carrying the HP turbine wheel and the HP compressor wheel, hereafter termed the HP shaft, can be the outer shaft, and the shaft carrying the LP turbine wheel and LP compressor wheel, hereafter termed the LP shaft, can be the inner shaft. The air can then flow through the compressor wheels in the same direction, or opposite directions, and the two shafts can be rotated in the same, or opposite, directions.

The bearings for one of the shafts can be in the housing, and for the other in, or on, the first shaft. Alternatively, the bearings for both shafts can be in the housing.

Different configurations of the bearing arrangement are possible. The bearings can be located between the wheels mounted on the shaft, or outside them. Further, one bearing can be located between the wheels, and a second bearing outside the wheels.

In a particularly advantageous arrangement of the improved turbocharger the shafts are mounted in an inner part of the housing which for purposes of dismantling can be slid out of a housing outer part either in the direction of the compressor or in the direction of the turbine. The air and exhaust-gas ducts connected to the housing do not then have to be dismantled.

Figure 2:
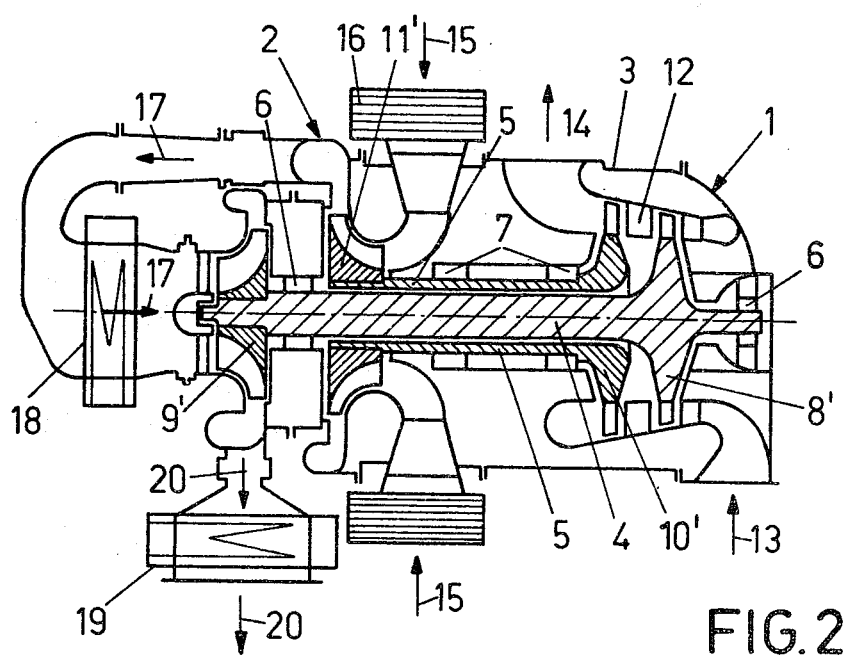
Figure 3:
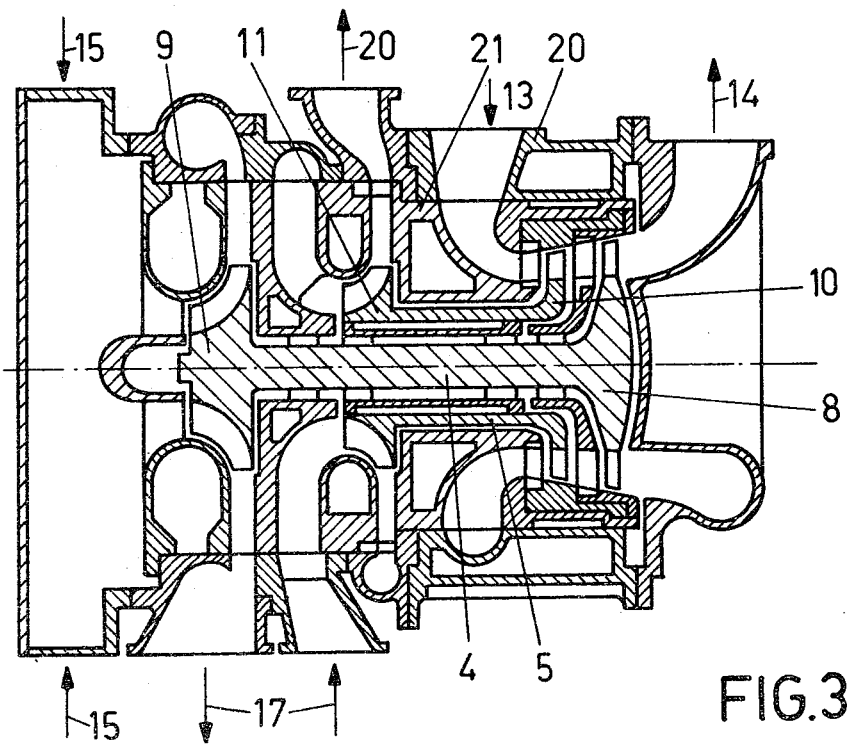
Figure 4:
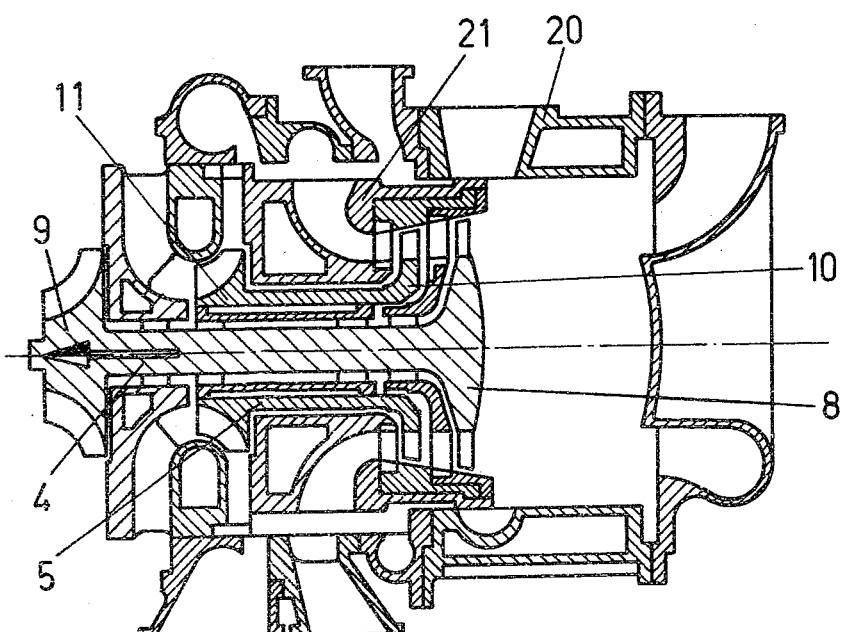
Figure 5:
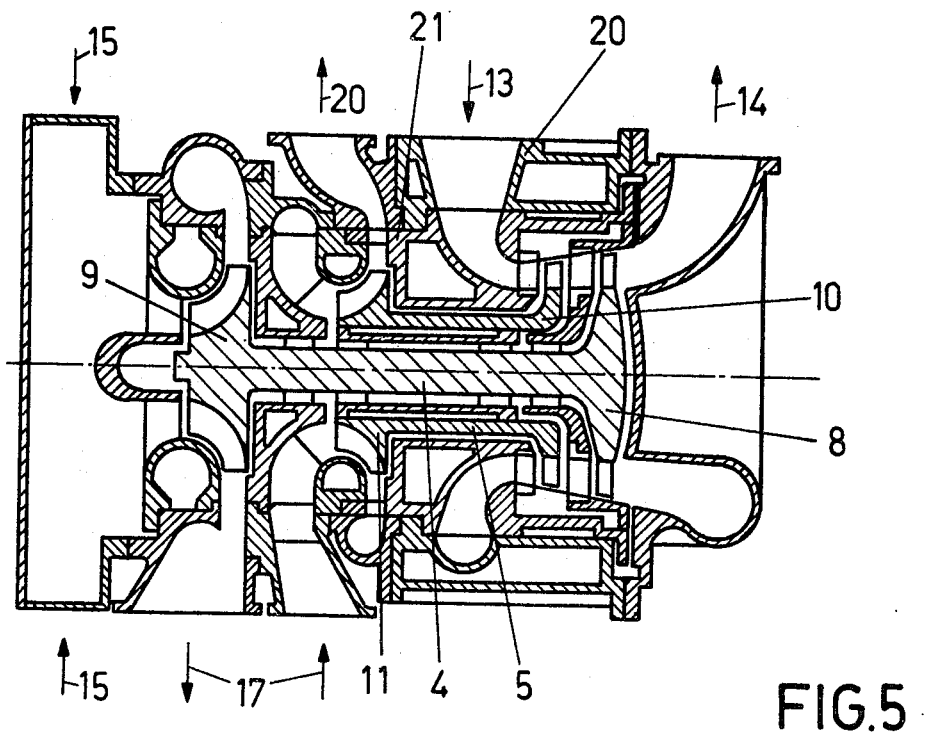
Figure 6:
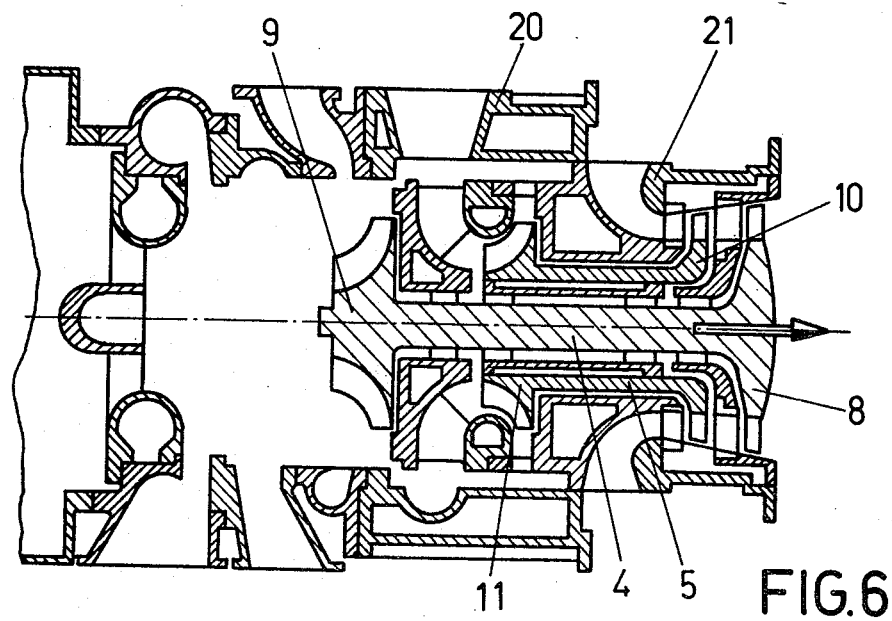

Examples of the invention are described below with reference to the various views in the accompanying drawings all of which are in longitudinal section:

FIG. 1 shows a two-stage turbocharger in which the inner shaft is the LP shaft and outer shaft is the HP shaft, FIG. 2 shows a two-stage turbocharger in which the inner shaft is the HP shaft and the outer shaft if the LP shaft, FIG. 3 shows a two-stage turbocharger the housing of which incorporates an outer part and an inner part which can be slid out of the former in the direction of the compressor, FIG. 4 shows a turbocharger as in FIG. 3, the inner part being depicted in the partly withdrawn position, FIG. 5 shows a two-stage turbocharger the housing of which incorporates an outer part and an inner part which can be slid out in the direction of the turbine, and FIG. 6 shows a turbocharger as in FIG. 5, the inner part being depicted in the partly withdrawn position.

In all of the figures, identical or similar components are identified by the same or similar reference symbols.

The turbocharger in FIG. 1 has a turbine section 1 with two exhaust-gas turbine stages and a compressor section 2 with two compressor stages. Two coaxial shafts 4 and 5 one inside the other are mounted in a housing 3 consisting of several parts, the inner shaft 4 being supported in bearings 6 and carrying the outer turbine wheel 8 and the outer compressor wheel 9, and the outer shaft 5 being supported in bearings 7 and carrying the inner turbine wheel 10 and the inner compressor wheel 11. In this embodiment the inner shaft 4 is the LP shaft, the turbine wheel 8 an LP turbine wheel and the compressor wheel 9 an LP compressor wheel, whereas the outer shaft 5 is the HP shaft, the turbine wheel 10 an HP turbine wheel and the compressor wheel 11 an HP compressor wheel. A stator stage 12 is provided between the turbine wheels 8 and 10. The bearings 6 carrying the inner shaft 4 are located outside the outer wheels 8 and 9, while the bearings 7 carrying the outer shaft 5 are located between the inner wheels 10 and 11.

The exhaust gases flow in the direction of the arrow 13 into the housing 3, through the blades of the HP turbine wheel 10, through the blades of the stator stage 12, the blades of the LP turbine wheel 8 and out of the housing in the direction of arrow 14, thus driving the shafts 4 and 5 and their compressor wheels 9 and 11. Outside air flows in the direction of the arrow 15 via the sound absorber 16 into the blades of the LP compressor wheel 9, where it is compressed to a certain pressure level. With the aim of reducing the power needed for compression, the air leaving the LP compressor is led in the direction of arrows 17 via the cooler 18 to the HP compressor wheel 11 in order to be further compressed, and flows in the direction of arrows 20 via a second cooler 19 to the cylinders of the engine (not shown). The air thus flows in the same direction through compressor wheels 9 and 11.

The turbocharger shown in FIG. 2 functions in essentially the same way as that in FIG. 1, differing from the latter only in its construction. Here the inner shaft 4 is the HP shaft, the turbine wheel 8' an HP turbine wheel and the compressor 9' an HP compressor wheel, whereas the outer shaft 5 is the LP shaft, the turbine wheel 10' an LP turbine wheel and the compressor wheel 11' an LP compressor wheel. The bearings 7 carrying the outer shaft 5 are here again located between the inner wheels 10' and 11', whereas one of the bearings 6 carrying the inner shaft 4 is located between the two outer wheels 8' and 9' while the other is outside wheel 8'. In this embodiment the air leaving the LP compressor wheel 11' is first diverted around the Hp compressor wheel 9' before entering the latter. The air thus flows in opposite directions through the compressor wheels 9' and 11'.

Various alternatives are possible for the arrangements described. Thus, for example, both bearings 6 can be between the outer wheels 8 and 9, or 8' and 9', both bearings 7 can be outside the inner wheels 10 and 11, or 10' and 11', or one each of bearings 6 and/or 7 can be located outside or inside their respective wheels. Furthermore, the outer shaft 5 can be supported on the inner shaft 4, in which case the respective bearings can similarly be located between the wheels 10 and 11, or 10' and 11', and/or outside them. The two turbine wheels 8 and 10, or 8' and 10' can also be arranged immediately next to each other, without an intervening stator stage 12. Furthermore, the two shafts can be rotated in the same direction or in opposite directions.

With the two-stage turbocharger shown in FIGS. 3 and 4 the housing has an outer part 20 in which an inner part 21 is fixed in a detachable manner. It is convenient if the two parts 20 and 21 consist of several sections fixed rigidly relative to each other. The inner part, when detached from the outer portion, is arranged to be movable axially in the outer part, and hence can be slid out in the direction of the compressor, as indicated in FIG. 4. The inner shaft 4, which is an LP shaft, has its bearings in the inner part 21, whereas the outer shaft 5, in the form of an HP shaft, is supported on the inner shaft 4. However, the bearings of the outer shaft 5 can also be in the inner part 21.

The two-stage exhaust-gas turbocharger shown in FIGS. 5 and 6 is similar to that described in FIGS. 3 and 4, except that the inner part 21 can be slid out of the outer part 20 in the direction of the turbine. The embodiments of FIGS. 3 to 6 have the advantage that the inner part 21 can be removed together with shafts 4 and 5 from the outer part 20 for purposes of dismantling, without having to detach the air and exhaust-gas ducts connected to the housing.

We claim:

1. An exhaust-gas turbocharger having high pressure and low pressure stages, comprising:
   a housing having an outer part and an inner part detachably mounted in said outer part;
   a high pressure bladed turbine wheel;
   a high pressure bladed compressor wheel;
   a low pressure bladed turbine wheel;
   a low pressure bladed compressor wheel;
   first and second coaxial shafts supported in said inner housing part and slidable out of the outer housing part as a single unit together with said inner housing part, one of said coaxial shafts being located inside the other and each of said shafts carrying one of said bladed turbine wheels and one of said bladed compressor wheels, the two wheels of each shaft belonging to the same stage.

2. An exhaust-gas turbocharger as defined in claim 1 wherein said outer housing part is comprised of a plurality of sections rigidly joined together in a detachable manner.

3. An exhaust-gas turbocharger as defined in claim 1 wherein said inner housing part is comprised of a plurality of sections rigidly joined together in a detachable manner.

4. An exhaust-gas turbocharger as defined in claim 1 and which further includes at least one air cooler located between the respective compressors of the low pressure and high pressure stage.

5. An exhaust-gas turbocharger as defined in claim 1 wherein the turbine and compressor wheels of the high pressure stage are located on the outer shaft, and the turbine and compressor wheels of the low pressure stage are located on the inner shaft.

6. An exhaust-gas turbocharger as defined in claim 1 and wherein the air to be compressed flows in the same direction through the compressor wheels of both stages.

7. An exhaust-gas turbocharger as defined in claim 1 wherein the outer shaft is supported on the inner shaft.

8. An exhaust-gas turbocharger as defined in claim 1 wherein the inner shaft is supported on bearings located within the housing.

9. An exhaust-gas turbocharger as defined in claim 8 and which includes at least one support bearing located between the wheels of the respective shaft.

10. An exhaust-gas turbocharger as defined in claim 9 and which further includes a stator stage located between the turbine wheels.

11. An exhaust-gas turbocharger as defined in claim 1 and wherein the turbine wheels of the high pressure and low pressure stages are located immediately adjacent each other without an interposed stator stage.

12. An exhaust-gas turbocharger having high pressure and low pressure stages, comprising:
   a housing having an outer part and an inner part detachably mounted in said outer part, the outer part including at least two sections which are rigidly joined together in a detachable manner so as to permit the detachment of the inner part from the outer part;
   means for slidably detaching the inner housing part from the outer housing part;
   a high pressure bladed turbine wheel;
   a high pressure bladed compressor wheel;
   a low pressure bladed turbine wheel;
   a low pressure bladed compressor wheel;
   first and second coaxial shafts supported in said inner housing part and slidable out of the outer housing as a single unit together with said inner housing part, one of said coaxial shafts being located inside the other and each of said shafts carrying one of said bladed turbine wheels and one of said bladed compressor wheels, the two wheels of each shaft belonging to the same stage.

13. An exhaust-gas turbocharger as defined in claim 12 wherein the inner housing part has a substantially rotational symmetry about a central longitudinal axis with successive circumferential portions of the inner housing part along the central axis having progressively decreasing radii, the successive circumferential portions of the inner housing part corresponding to successive annular portions of the outer housing part having progressively decreasing inside diameters.

14. An exhaust-gas turbocharger as defined in claim 12 wherein one of the two sections of the outer housing part which are joined together in a detachable manner includes air inlet means for supplying a flow of air into the low pressure stage of the compressor.

* * * * *